United States Patent [19]

Shawver et al.

[11] Patent Number: 5,952,252

[45] Date of Patent: *Sep. 14, 1999

[54] FULLY ELASTIC NONWOVEN FABRIC LAMINATE

[75] Inventors: Susan Elaine Shawver; Leslie Warren Collier, IV, both of Roswell; Paul Windsor Estey, Cumming; Susan Carol Paul, Alpharetta, all of Ga.

[73] Assignee: Kimberly-Clark Worldwide, Inc., Neeah, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/603,961

[22] Filed: Feb. 20, 1996

[51] Int. Cl.$^6$ .................................................. B32B 27/00
[52] U.S. Cl. ..................... 442/407; 442/329; 442/340; 442/345; 442/347; 442/351; 442/364; 442/389; 442/400; 442/401; 442/415
[58] Field of Search ........................... 442/329, 340, 442/345, 347, 351, 364, 389, 400, 401, 407, 415

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney | 161/72 |
| 3,502,538 | 3/1970 | Petersen | 161/150 |
| 3,502,763 | 3/1970 | Hartmann | 264/210 |
| 3,542,615 | 11/1970 | Dobo et al. | 156/181 |
| 3,692,618 | 9/1972 | Dorschner et al. | 161/72 |
| 3,802,817 | 4/1974 | Matsuki et al. | 425/66 |
| 3,849,241 | 11/1974 | Butin et al. | 161/169 |
| 3,855,046 | 12/1974 | Hansen et al | 161/150 |
| 4,041,203 | 8/1977 | Brock et al. | 428/157 |
| 4,340,563 | 7/1982 | Appel et al. | 264/518 |
| 4,374,888 | 2/1983 | Bornslaeger | 428/198 |
| 4,542,199 | 9/1985 | Kaminsky et al. | 526/160 |
| 4,631,933 | 12/1986 | Carey, Jr. | 66/192 |
| 4,652,487 | 3/1987 | Morman | 428/138 |
| 4,655,760 | 4/1987 | Morman et al. | 604/385 |
| 4,657,802 | 4/1987 | Morman | 428/152 |
| 4,663,220 | 5/1987 | Wisneski et al. | 428/221 |
| 4,692,368 | 9/1987 | Taylor et al. | 428/137 |
| 4,692,371 | 9/1987 | Morman et al. | 428/224 |
| 4,704,116 | 11/1987 | Enloe | 604/385 |
| 4,707,398 | 11/1987 | Boggs | 428/224 |
| 4,710,187 | 12/1987 | Boland et al. | 604/385 |
| 4,720,415 | 1/1988 | Vander Wielen et al. | 428/152 |
| 4,724,184 | 2/1988 | Killian et al. | 428/227 |
| 4,741,949 | 5/1988 | Morman et al. | 428/224 |
| 4,781,966 | 11/1988 | Taylor | 428/152 |
| 4,787,699 | 11/1988 | Moulin | 350/96.21 |
| 4,789,699 | 12/1988 | Kieffer et al. | 524/271 |
| 4,803,117 | 2/1989 | Daponte | 428/228 |
| 4,820,572 | 4/1989 | Killian et al. | 428/227 |
| 4,822,435 | 4/1989 | Igaue et al. | 156/164 |
| 4,923,742 | 5/1990 | Killian et al. | 428/283 |
| 4,965,122 | 10/1990 | Morman | 428/225 |
| 4,981,747 | 1/1991 | Morman | 428/198 |
| 5,026,364 | 6/1991 | Robertson | 604/385.1 |
| 5,064,802 | 11/1991 | Stevens et al. | 502/155 |
| 5,108,820 | 4/1992 | Kaneko et al. | 428/198 |
| 5,108,827 | 4/1992 | Gessner | 428/219 |
| 5,169,706 | 12/1992 | Collier, IV et al. | 428/152 |
| 5,189,192 | 2/1993 | LaPointe et al. | 556/11 |
| 5,204,429 | 4/1993 | Kaminsky et al. | 526/308 |
| 5,226,992 | 7/1993 | Morman | 156/62.4 |
| 5,272,236 | 12/1993 | Lai et al. | 526/348.5 |
| 5,278,272 | 1/1994 | Lai et al. | 526/348.5 |
| 5,304,599 | 4/1994 | Himes | 525/98 |
| 5,332,613 | 7/1994 | Taylor et al. | 428/152 |
| 5,336,545 | 8/1994 | Morman | 428/152 |
| 5,336,552 | 8/1994 | Strack et al. | 428/224 |
| 5,349,100 | 9/1994 | Mintz | 585/350 |
| 5,352,749 | 10/1994 | DeChellis et al. | 526/68 |
| 5,374,696 | 12/1994 | Rosen et al. | 526/126 |
| 5,376,198 | 12/1994 | Fahrenkrug et al. | 156/164 |
| 5,382,400 | 1/1995 | Pike et al. | 264/168 |
| 5,413,570 | 5/1995 | Enloe | 604/385.2 |
| 5,415,644 | 5/1995 | Enloe | 604/385.2 |

FOREIGN PATENT DOCUMENTS 0 602 613  6/1994  European Pat. Off. ......... D04H 1/56

OTHER PUBLICATIONS

G. W. Coates, et al. Oscillating Stereo Control: A Strategy For The Synthesis Of Thermoplastic Elastomeric Polypropylene, Pg. 217.
K. B. Wagner, Science, vol. 267, Jan. 13, 1995, Pg. 191.
John Manson, et al. *Polymer Blends& Composites*, Plenum Press, Plenum Publication. Pgs. 273–277.
C. Allen Bodford, et al. Multidenier NW Fabrics For Leg Cuff and Other Diaper Applications, Nonwovens World, Summer 1995 Pgs. 59–62.

*Primary Examiner*—Helen L. Pezzuto
*Attorney, Agent, or Firm*—William D. Herrick

[57] ABSTRACT

There is provided a fully elastic, breathable, barrier fabric comprising a nonwoven web layer of fibers of less than 40 microns in average diameter, where the web has a hydrohead of at least 10 mbar, a Frazier Permeability of at least 100 CFM, a basis weight of less than 68 gsm and which is made from an elastic polymer. If the fabric is a laminate it may be an SMS, SBL or NBL laminate. This fabric is particularly well suited to use as a containment flap for personal care products such as diapers, incontinence products and feminine hygiene products and in infection control products.

14 Claims, 1 Drawing Sheet

FULLY ELASTIC NONWOVEN FABRIC LAMINATE

BACKGROUND OF THE INVENTION

This invention relates to nonwoven fabrics for use in various personal care products such as diapers, training pants, adult incontinence products, feminine hygiene products, infection control products and any other type of article used to contain bodily fluids. More particularly, personal care products generally include containment flaps which serve to keep the managed fluids from escaping from the article and soiling the clothing or bedding of the wearer. These containment flaps are an especially well suited use for the disclosed invention.

In order for containment articles to function efficiently, the fabric must have sufficient barrier properties to perform its primary function of containing fluids, yet must also be breathable so as not to inhibit skin comfort. In personal care and infection control products the fabric should ideally be elastic to conform to the body of the wearer and recover from stretching due to the movement of the wearer, all the while continuing to perform its function as a barrier. In the past, containment flaps, for example, have been made with separate materials supplying the various functions desired. Elastic threads, for example, have been joined with non-elastic materials to supply the requisite elasticity. Other methods of attaching an elastic member to a non-elastic member to satisfy the requirements for a containment flap have also been used. While these attempts to solve the problem of breathability with barrier properties for an elastic member have been partially successful, there remains a need for a material which will have the needed barrier and breathability and which is fully elastic, i.e. all components of the material are elastic.

In infection control applications, such as in a medical gown, stretch and recovery properties are important in order to produce a more form fitting and hence more comfortable gown without extra fabric in the area of high stretch.

It is an object of this invention to provide a fully elastic, breathable, barrier nonwoven fabric which may be used in infection control and personal care products and which will be a comfortable and effective means of containing fluids within the article.

SUMMARY OF THE INVENTION

The objects of the invention are satisfied by a fully elastic, breathable, barrier fabric comprising at least one web of nonwoven web where the fabric has a hydrohead of at least 10 mbar, a Frazier Permeability of at least 100 CFM and which is elastic. If the fabric is a laminate it may be an SMS. It is also possible that the fabric be an SBL or NBL laminate in which all layers are elastic. This fabric is particularly well suited to use in infection control products and as a containment flap for personal care products such as diapers, incontinence products and feminine hygiene products.

DEFINITIONS

Figure 1:
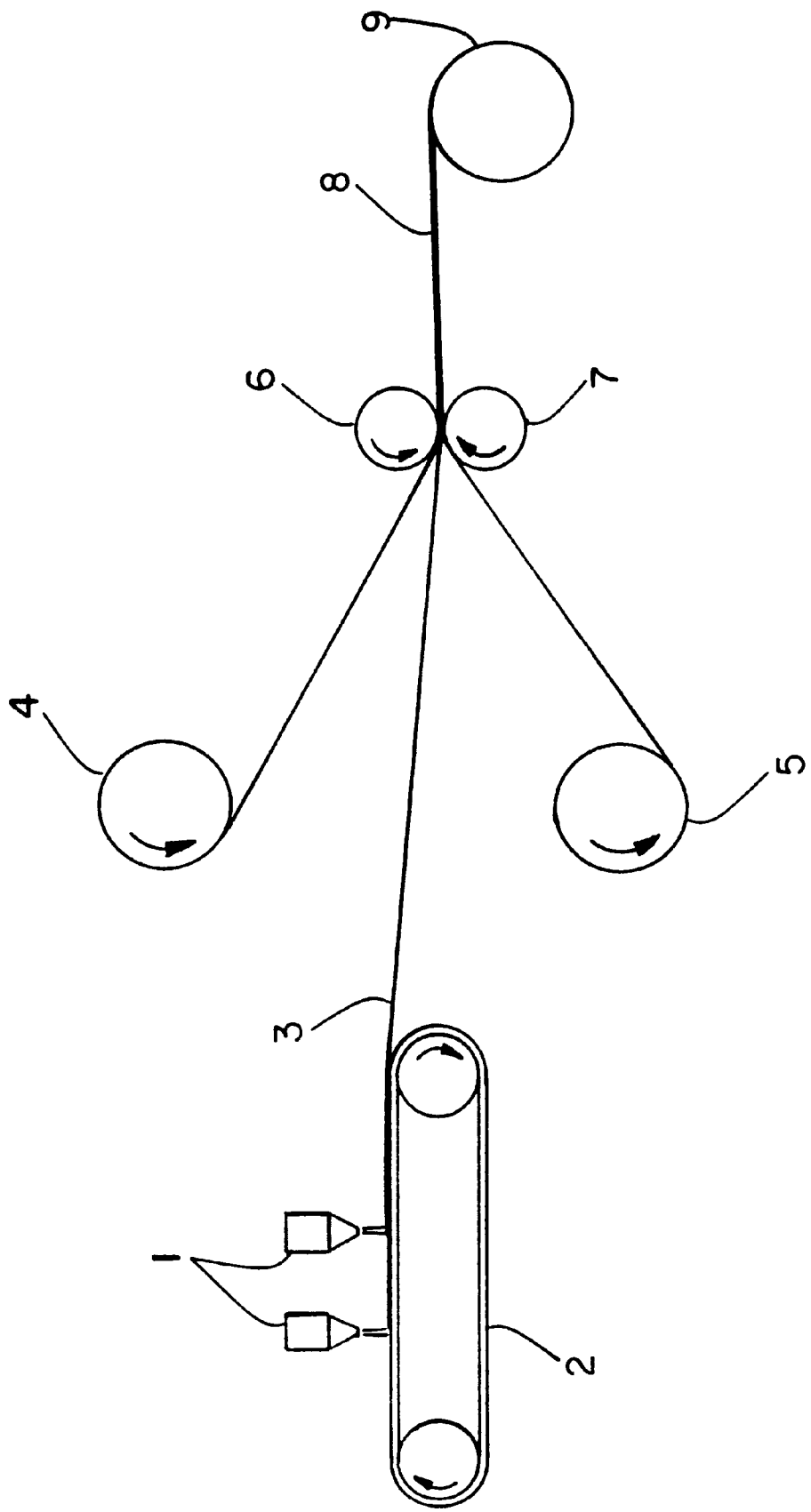
FIG. 1 is a schematic illustration of an apparatus which may be utilized to perform the method and to produce the nonwoven web of the present invention.

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 75 microns, for example, having an average diameter of from about 0.5 microns to about 50 microns, or more particularity, microfibers may have an average diameter of from about 2 microns to about 40 microns. Another frequently used expression of fiber diameter is denier, which is defined as grams per 9000 meters of a fiber and may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 ($15^2 \times 0.89 \times 0.00707 = 1.415$). Outside the United States the unit of measurement is more commonly the "tex", which is defined as the grams per kilometer of fiber and which may be calculated as denier/9.

As used herein the term "composite elastic material" refers to an elastic material which may be a multicomponent material or a multilayer material in which one layer is elastic. These materials may be, for example, "stretch bonded" laminates (SBL) and "neck bonded" laminates (NBL).

Conventionally, "stretch bonded" refers to an elastic member being bonded to another member while the elastic member is extended. "Stretch bonded laminate" or SBL conventionally refers to a composite material having at least two layers in which one layer is a gatherable layer and the other layer is an elastic layer. The layers are joined together when the elastic layer is in an extended condition so that upon relaxing the layers, the gatherable layer is gathered. Such a multilayer composite elastic material may be stretched to the extent that the nonelastic material gathered between the bond locations allows the elastic material to elongate. One type of multilayer composite elastic material is disclosed, for example, by U.S. Pat. No. 4,720,415 to Vander Wielen et al., which is hereby incorporated by reference in its entirety, and in which multiple layers of the same polymer produced from multiple banks of extruders are used. Other composite elastic materials are disclosed in U.S. Pat. No. 4,789,699 to Kieffer et al., U.S. Pat. No. 4,781,966 to Taylor and U.S. Pat. Nos. 4,657,802 and 4,652,487 to Morman and 4,655,760 and 4,692,371 to Morman et al.

Conventionally, "neck bonded" refers to an elastic member being bonded to a non-elastic member while the non-elastic member is extended or necked. "Neck bonded laminate" or NBL conventionally refers to a composite material having at least two layers in which one layer is a necked, non-elastic layer and the other layer is an elastic layer. The layers are joined together when the non-elastic layer is in an extended condition. Examples of neck-bonded laminates are such as those described in U.S. Pat. Nos. 5,226,992, 4,981, 747, 4,965,122 and 5,336,545 to Morman.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Levy, and U.S. Pat. No. 3,542,615 to Dobo et al. Spunbond fibers are generally not tacky when they are deposited onto a collecting surface. Spunbond fibers are microfibers which are generally continuous and have average diameters (from a sample size of at least 10) larger than 7 microns, more particularly, between about 10 and 30 microns.

As used herein the term "meltblown fibers" means fibers formed by extruding a molten thermoplastic material through a plurality of fine, usually circular, die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Buntin. Meltblown fibers are microfibers which may be continuous or discontinuous, are generally smaller than 10 microns in average diameter, and are generally tacky when deposited onto a collecting surface.

Spunbond and meltblown fabrics may be combined into "SMS laminates" wherein some of the layers are spunbond and some meltblown such as a spunbond/meltblown/spunbond (SMS) laminate as disclosed in U.S. Pat. No. 4,041,203 to Brock et al. U.S. Pat. No. 5,169,706 to Collier, et al, and U.S. Pat. No. 4,374,888 to Bornslaeger. Such a laminate may be made by sequentially depositing onto a moving forming belt first a spunbond fabric layer, then a meltblown fabric layer and last another spunbond layer and then bonding the laminate in a manner described below. Alternatively, the fabric layers may be made individually, collected in rolls, and combined in a separate bonding step. Such fabrics usually have a basis weight of from about 0.1 to 12 osy (6 to 400 gsm), or more particularly from about 0.75 to about 3 osy.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configuration of the material. These configurations include, but are not limited to isotactic, syndiotactic and random symmetries.

The term elastic is used herein to mean any material which, upon application of a biasing force, is stretchable to a stretched, biased length which is at least about 125 percent, that is at least about one and one quarter, of its relaxed, unbiased length, and which will recover at least about 40 percent of its stretch or elongation upon release of the stretching, elongating force. A hypothetical example which would satisfy this definition of an elastic or elastomeric material would be a one (1) inch sample of a material which is elongatable to at least 1.25 inches and which, upon being elongated to 1.25 inches and released, will return to a length of not more than 1.15 inches. Many elastic materials may be stretched by much more than 25 percent of their relaxed length, for example 100 percent, or more, and many of these will return to substantially their original relaxed length, for example, to within 105 percent of their original relaxed length upon release of the stretching, elongating force. In As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side by side arrangement, a pie arrangement or an "islands-in-the-sea" arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein the term "biconstituent fibers" refers to fibers which have been formed from at least two polymers extruded from the same extruder as a blend. Biconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Biconstituent fibers are sometimes also referred to as multiconstituent fibers. Fibers of this general type are discussed in, for example, U.S. Pat. No. 5,108,827 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2, at pages 273 through 277.

As used herein, the term "machine direction" or MD means the length of a fabric in the direction in which it is produced. The term "cross machine direction" or CD means the width of fabric, i.e. a direction generally perpendicular to the MD. As used herein the term "monocomponent" fiber refers to a fiber formed from one or more extruders using only one polymer. This is not meant to exclude fibers formed from one polymer to which small amounts of additives have been added for coloration, antistatic properties, lubrication, hydrophilicity, etc. These additives, e.g. titanium dioxide for coloration, are generally present in an amount less than 5 weight percent and more typically about 2 weight percent.

As used herein, "ultrasonic bonding" means a process performed, for example, by passing the fabric between a sonic horn and anvil roll as illustrated in U.S. Pat. No. 4,374,888 to Bornslaeger.

As used herein "thermal point bonding" involves passing a fabric or web of fibers to be bonded between a heated calender roll and an anvil roll. The calender roll is usually, though not always, patterned in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds and a wire weave pattern looking as the name suggests, e.g. like a window screen. Typically, the percent bonding area varies from around 10% to around 30% of the area of the fabric laminate web. As is well known in the art, the spot bonding holds the laminate layers together as well as imparts integrity to each individual layer by bonding filaments and/or fibers within each layer.

As used herein, the term "personal care product" means diapers, training pants, absorbent underpants, adult incontinence products, and feminine hygiene products.

As used herein, the term "infection control product" means medically oriented items such as surgical gowns and drapes, face masks, head coverings like bouffant caps, surgical caps and hoods, footwear like shoe coverings, boot covers and slippers, wound dressings, bandages, sterilization wraps, wipers, garments like lab coats, coveralls, aprons and jackets, patient bedding, stretcher and bassinet sheets, and the like.

TEST METHODS

Hydrohead: A measure of the liquid barrier properties of a fabric is the hydrohead test. The hydrohead test determines the pressure of water (in millibars) which the fabric will resist before a predetermined amount of liquid passes through. A fabric with a higher hydrohead reading indicates it has a greater barrier to liquid penetration than a fabric with a lower hydrohead. The hydrohead test is performed according to Federal Test Standard No. 191A, Method 5514.

Frazier Permeability: A measure of the permeability of a fabric or web to air is the Frazier Permeability which is performed according to Federal Test Standard No. 191A, Method 5450 dated Jul. 20, 1978, and is reported as an average of 3 sample readings. Frazier Permeability measures the air flow rate through a web in cubic feet of air per square foot of web per minute or CFM. Convert CFM to liters per square meter per minute (LMM) by multiplying CFM by 304.8.

Cyclic testing: Cyclic testing is performed using a Sintech 2 computerized material testing system available from Sintech Incorporated of Stoughton, Mass.

In the elongation or stretch to stop test, a 3 inch by 6 inch (76 mm by 152 mm) sample, with the larger dimension being the machine direction, is placed in the jaws of the Sintech 2 machine using a gap of 50 mm between the jaws. The sample is then pulled to a stop load of 2000 gms with a crosshead speed of about 500 mm per minute. The elongation in percent relative to the unstretched length at this point is the stretch to stop value.

The elongation at stop test also yields the value for elongation at intercept. The elongation at intercept is the load in grams where the elasticity of the material ends and the tensile strength of the sample takes over. The value of 75 percent of the elongation at intercept is used to determine the maximum percent the sample will then be stretched in the cycling test.

In the cyclic testing, a material is taken to a fixed extension corresponding to 75 percent of the elongation at intercept for 5 times, and allowed to return to its original dimensions if it will do so. The measurements taken are the load at elongation, hysteresis loss and load at return. This is used to develop a graphical representation of the results, with load on the y axis and elongation on the x axis. This graph yields a curve with an area thereunder called the Total Energy Absorbed or "TEA". The ratio of the TEA curves for a sample for various cycles is a value independent of material, basis weight and sample width that can be compared to other samples.

BRIEF DESCRIPTION OF THE DRAWINGS

FIG. 1 shows a schematic diagram of an in-line manufacturing process suitable for the production of a composite elastic material.

DETAILED DESCRIPTION OF THE INVENTION

Thermoplastic polymers are useful in the production of films, fibers and webs for use in a variety of products such as personal care products, infection control products, garments and protective covers. In many applications it is desirable that the film, fiber or web be elastic so that the products made with the film, fiber or web can conform to an object or so that it may stretch somewhat without failing.

Particular application of elastic materials is in the field of personal care products like feminine hygiene products, incontinence products, diapers and training pants and in the field of infection control products. More particularly, within the realm of infection control products, there is a need for a highly conforming fluid barrier material which will also conform to the body. Specific examples of such a use are as workwear or medical gowns.

Materials for gowns must have good strength, durability and puncture resistance. It is also usually desired that such materials be thin in order to retain minimal heat and preferably to be stretchable. The inventors have found that an SMS fabric wherein all layers are elastic, provides a material ideally suited for such applications. The spunbond layers provided the requisite strength, durability and puncture resistance to the fabric when compared to meltblown fabrics alone. Since all layers are elastic, the fabric may be made thinner than an SBL fabric and so produce less heat retention. Elastic SMS is also much less directional in its stretch properties than compared to an NBL fabric, for example. Further, since the fabric is fully elastic, there is no need for the excess fabric usually used in gown production to provide more room to allow for arm movement, for example. Removing the excess fabric results in a less expensive, lighter product.

The barrier properties of a fabric may be measured using the hydrohead test. This test determines the pressure of water (in millibars) which the fabric will resist before a predetermined amount of liquid passes through. A fabric with a higher hydrohead reading indicates it has a greater barrier to liquid penetration than a fabric with a lower hydrohead. The hydrohead value of a material will be influenced by such factors as the size of the fibers, finer fibers producing smaller pores for liquid to pass through, and the hydrophobicity of the fibers. In functioning as a containment flap in a personal care product, for example, the hydrohead value of a material must be sufficiently high to prevent liquid from passing beyond the fabric and leaking.

The breathability of a material may be measured by the Frazier permeability. It is very important that a fabric for personal care and infection control product applications, while having good barrier properties, also have very good breathability. Breathability allows for the loss of perspiration through the fabric without undue discomfort to the wearer as would be produced with a monolithic film, for example. A sufficiently high permeability for a gown, for example, would be one above about 100 CFM according to the Frazier test.

Elasticity is a key property in applications such as infection control products since the fabric will be in contact with the skin and must be able to bend and stretch with the activity of the normal wearer. A nonelastic fabric either doesn't yield and may tear, or if it does yield with no elastic recovery it quickly stretches in this service and produces an unsightly sagging stretched fabric area around the places most often moved, e.g. elbows. A fabric having elasticity provided by just a few individual strands can result in red marking and so is also less than ideal. A fully elastic fabric can conform to the wearer's body without red marking and gapping or sagging.

The three most critical need areas discussed above (barrier, breathability, elasticity) are satisfied by the fabric of this invention while also providing a comparatively pleasing hand, when compared to, for example Kraton® fabric, and puncture resistance. The fabric of this invention provides a hydrohead above 10 mbar, a Frazier permeability above 100 CFM, and most importantly, is fully elastic, e.g., all layers from which the laminate is constructed are elastic.

Elastomeric polymers have been used in the past for such applications but are somewhat limited by their intrinsic properties as mentioned above (e.g. rubbery hand, poor barrier properties). This factor is not an issue when such polymers are used as the meltblown layer surrounded by spunbond layers in an SMS laminate, for example, and it may be alleviated by topical treatments.

Elastomeric thermoplastic polymers useful in the practice of this invention may be those made from block copolymers such as polyurethanes, copolyesters, polyamide polyether block copolymers, ethylene vinyl acetates (EVA), block copolymers having the general formula A-B-A' or A-B like copoly(styrene/ethylene-butylene), styrene-poly(ethylene-propylene)-styrene, styrene-poly(ethylene-butylene)-styrene, (polystyrene/poly(ethylene-butylene)/polystyrene, poly(styrene/ethylene-butylene/styrene) and the like.

Useful elastomeric resins include block copolymers having the general formula A-B-A' or A-B, where A and A' are each a thermoplastic polymer endblock which contains a styrenic moiety such as a poly (vinyl arene) and where B is an elastomeric polymer midblock such as a conjugated diene or a lower alkene polymer. Block copolymers of the A-B-A' type can have different or the same thermoplastic block polymers for the A and A' blocks, and the present block copolymers are intended to embrace linear, branched and radial block copolymers. In this regard, the radial block copolymers may be designated (A-B)$_m$-X, wherein X is a polyfunctional atom or molecule and in which each (A-B)$_m$- radiates from X in a way that A is an endblock. In the radial block copolymer, X may be an organic or inorganic polyfunctional atom or molecule and m is an integer having the same value as the functional group originally present in X. It is usually at least 3, and is frequently 4 or 5, but not limited thereto. Thus, in the present invention, the expression "block copolymer", and particularly "A-B-A'" and "A-B" block copolymer, is intended to embrace all block copolymers having such rubbery blocks and thermoplastic blocks as discussed above, which can be extruded (e.g., by meltblowing), and without limitation as to the number of blocks. The elastomeric nonwoven web may be formed from, for example, elastomeric (polystyrene/poly(ethylene-butylene)/polystyrene) block copolymers. Commercial examples of such elastomeric copolymers are, for example, those known as KRATON® materials which are available from Shell Chemical Company of Houston, Tex. KRATON® block copolymers are available in several different formulations, a number of which are identified in U.S. Pat. Nos. 4,663,220 and 5,304,599, hereby incorporated by reference.

Polymers composed of an elastomeric A-B-A-B tetrablock copolymer may also be used in the practice of this invention. Such polymers are discussed in U.S. Pat. No. 5,332,613 to Taylor et al. In such polymers, A is a thermoplastic polymer block and B is an isoprene monomer unit hydrogenated to substantially a poly(ethylene-propylene) monomer unit. An example of such a tetrablock copolymer is a styrene-poly(ethylene-propylene)-styrene-poly (ethylene-propylene) or SEPSEP elastomeric block copolymer available from the Shell Chemical Company of Houston, Tex. under the trade designation KRATON®.

Other exemplary elastomeric materials which may be used include polyurethane elastomeric materials such as, for example, those available under the trademark ESTANE® from B. F. Goodrich & Co. or MORTHANE® from Morton Thiokol Corp., polyester elastomeric materials such as, for example, those available under the trade designation HYTREL® from E. I. DuPont De Nemours & Company, and those known as ARNITEL®, formerly available from Akzo Plastics of Arnhem, Holland and now available from DSM of Sittard, Holland.

Another suitable material is a polyester block amide copolymer having the formula:

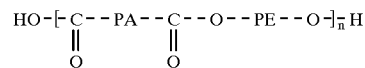

where n is a positive integer, PA represents a polyamide polymer segment and PE represents a polyether polymer segment. In particular, the polyether block amide copolymer has a melting point of from about 150° C. to about 170° C., as measured in accordance with ASTM D-789; a melt index of from about 6 grams per 10 minutes to about 25 grams per 10 minutes, as measured in accordance with ASTM D-1238, condition Q (235 C/1 Kg load); a modulus of elasticity in flexure of from about 20 Mpa to about 200 Mpa, as measured in accordance with ASTM D-790; a tensile strength at break of from about 29 Mpa to about 33 Mpa as measured in accordance with ASTM D-638 and an ultimate elongation at break of from about 500 percent to about 700 percent as measured by ASTM D-638. A particular embodiment of the polyether block amide copolymer has a melting point of about 152° C. as measured in accordance with ASTM D-789; a melt index of about 7 grams per 10 minutes, as measured in accordance with ASTM D-1238, condition Q (235 C/1 Kg load); a modulus of elasticity in flexure of about 29.50 Mpa, as measured in accordance with ASTM D-790; a tensile strength at break of about 29 Mpa, a measured in accordance with ASTM D-639; and an elongation at break of about 650 percent as measured in accordance with ASTM D-638. Such materials are available in various grades under the trade designation PEBAX® from Atochem Inc. Polymers Division (RILSAN®), of Glen Rock, N.J. Examples of the use of such polymers may be found in U.S. Pat. Nos. 4,724,184, 4,820,572 and 4,923,742 hereby incorporated by reference, to Killian et al. and assigned to the same assignee as this invention.

Elastomeric polymers also include copolymers of ethylene and at least one vinyl monomer such as, for example, vinyl acetates, unsaturated aliphatic monocarboxylic acids, and esters of such monocarboxylic acids. The elastomeric copolymers and formation of elastomeric nonwoven webs from those elastomeric copolymers are disclosed in, for example, U.S. Pat. No. 4,803,117.

The thermoplastic copolyester elastomers include copolyetheresters having the general formula:

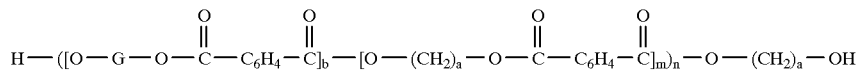

where "G" is selected from the group consisting of poly(oxyethylene)-alpha,omega-diol, poly(oxypropylene)-alpha, omega-diol, poly(oxytetramethylene)-alpha,omega-diol and "a" and "b" are positive integers including 2, 4 and 6, "m" and "n" are positive integers including 1–20. Such materials generally have an elongation at break of from about 600 percent to 750 percent when measured in accordance with ASTM D-638 and a melt point of from about 350° F. to about 400° F. (176 to 205° C.) when measured in accordance with ASTM D-2117.

Commercial examples of such copolyester materials are, for example, those known as ARNITEL®, formerly available from Akzo Plastics of Arnhern, Holland and now available from DSM of Sittard, Holland, or those known as HYTREL® which are available from E. I. duPont de Nemours of Wilmington, Del. Formation of an elastomeric nonwoven web from polyester elastomeric materials is disclosed in, for example, U.S. Pat. No. 4,741,949 to Morman et al. and U.S. Pat. No. 4,707,398 to Boggs, hereby incorporated by reference.

The above mentioned polymers are generally limited to meltblowing applications though the inventors have had some success in spunbonding some of them. The inventors contemplate, therefore, that these materials may be used for either spunbonding or meltblowing.

These materials have recently been joined by a new class of polymers which, when made into fabric, has excellent barrier, breathability, elasticity and a pleasing hand. The new class of polymers is referred to as "metallocene" polymers or as produced according to the metallocene process. Metallocene polymers have been developed which may be processed by meltblowing or spunbonding.

The metallocene process generally uses a metallocene catalyst which is activated, i.e. ionized, by a co-catalyst. Metallocene catalysts include bis(n-butylcyclopentadienyl) titanium dichloride, bis(n-butylcyclopentadienyl)zirconium dichloride, bis(cyclopentadienyl)scandium chloride, bis(indenyl)zirconium dichloride, bis(methylcyclopentadienyl) titanium dichloride, bis(methylcyclopentadienyl)zirconium dichloride, cobaltocene, cyclopentadienyltitanium trichloride, ferrocene, hafnocene dichloride, isopropyl (cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, among others. A more exhaustive list of such compounds is included in U.S. Pat. No. 5,374,696 to Rosen et al. and assigned to the Dow Chemical Company. Such compounds are also discussed in U.S. Pat. No. 5,064,802 to Stevens et al. and also assigned to Dow.

The metallocene process, and particularly the catalysts and catalyst support systems are the subject of a number of patents. U.S. Pat. No. 4,542,199 to Kaminsky et al. describes a procedure wherein methylaluminoxane (MAO) is added to toluene, the metallocene catalyst of the general formula (cyclopentadienyl)2MeRHal wherein Me is a transition metal, Hal is a halogen and R is cyclopentadienyl or a C1 to C6 alkyl radical or a halogen, is added, and ethylene is then added to form polyethylene. U.S. Pat. No. 5,189,192 to LaPointe et al. and assigned to Dow Chemical describes a process for preparing addition polymerization catalysts via metal center oxidation. U.S. Pat. No. 5,352,749 to Exxon Chemical Patents, Inc. describes a method for polymerizing monomers in fluidized beds. U.S. Pat. No. 5,349,100 describes chiral metallocene compounds and preparation thereof by creation of a chiral center by enantioselective hydride transfer.

Co-catalysts are materials such as methylaluminoxane (MAO) which is the most common, other alkylaluminums and boron containing compounds like tris(pentafluorophenyl)boron, lithium tetrakis(pentafluorophenyl)boron, and dimethylanilinium tetrakis(pentafluorophenyl)boron. Research is continuing on other co-catalyst systems or the possibility of minimizing or even eliminating the alkylaluminums because of handling and product contamination issues. The important point is that the metallocene catalyst be activated or ionized to a cationic form for reaction with the monomer(s) to be polymerized.

Polymers produced using metallocene catalysts have the unique advantage of having a very narrow molecular weight range. Polydispersity numbers (Mw/Mn) of below 4 and as even below 2 are possible for metallocene produced polymers. These polymers also have a narrow short chain branching distribution when compared to otherwise similar Ziegler-Natta produced type polymers.

It is also possible using a metallocene catalyst system to control the isotacticity of the polymer quite closely when stereo selective metallocene catalysts are employed. In fact, polymers have been produced having an isotacticity of in excess of 99 percent. It is also possible to produce highly syndiotactic polypropylene using this system.

Controlling the isotacticity of a polymer can also result in the production of a polymer which contains blocks of isotactic and blocks of atactic material alternating over the length of the polymer chain. This construction results in an elastic polymer by virtue of the atactic portion. Such polymer synthesis is discussed in the journal Science, vol. 267, (Jan. 13, 1995) at p. 191 in an article by K. B. Wagner. Wagner, in discussing the work of Coates and Waymouth, explains that the catalyst oscillates between the stereochemical forms resulting in a polymer chain having running lengths of isotactic sterocenters connected to running lengths of atactic centers. Isotactic dominance is reduced producing elasticity. Geoffrey W. Coates and Robert M. Waymouth, in an article entitled "Oscillating Stereocontrol: A Strategy for the Synthesis of Thermoplastic Elastomeric Polypropylene" at page 217 in the same issue, discuss their work in which they used metallocene bis(2-phenylindenyl)-zirconium dichloride in the presence of methylaluminoxane (MAO), and, by varying the pressure and temperature in the reactor, oscillate the polymer form between isotactic and atactic.

Commercial production of metallocene polymers is somewhat limited but growing. Such polymers are available from Exxon Chemical Company of Baytown, Tex. under the trade name EXXPOL®0 for polypropylene based polymers and EXACT® for polyethylene based polymers. Dow Chemical Company of Midland, Mich. has polymers commercially available under the name ENGAGE®. These materials are believed to be produced using non-stereo selective metallocene catalysts. Exxon generally refers to their metallocene catalyst technology as "single site" catalysts while Dow refers to theirs as "constrained geometry" catalysts under the name INSITE® to distinguish them from traditional Ziegler-Natta catalysts which have multiple reaction sites. Other manufacturers such as Fina Oil, BASF, Amoco, Hoechst and Mobil are active in this area and it is believed that the availability of polymers produced according to this technology will grow substantially in the next decade. In the practice of the instant invention, elastic polyolefins like polypropylene and polyethylene are preferred, most especially elastic polypropylene.

Regarding metallocene based elastomeric polymers, U.S. Pat. No. 5,204,429 to Kaminsky et al. describes a process which may produce elastic copolymers from cycloolefins and linear olefins using a catalyst which is a sterorigid chiral metallocene transition metal compound and an aluminoxane. The polymerization is carried out in an inert solvent such as an aliphatic or cycloaliphatic hydrocarbon such as toluene. The reaction may also occur in the gas phase using the monomers to be polymerized as the solvent. U.S. Pat. Nos. 5,278,272 and 5,272,236, both to Lai et al., assigned to Dow Chemical and entitled "Elastic Substantially Linear Olefin Polymers" describe polymers having particular elastic properties.

Processing aids may be added to the elastomeric polymer as well. A polyolefin, for example, may be blended with the elastomeric polymer (e.g., the elastomeric block copolymer) to improve the processability of the composition. The polyolefin must be one which, when so blended and subjected to an appropriate combination of elevated pressure and elevated temperature conditions, is extrudable, in blended form, with the elastomeric polymer. Useful blending polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation Petrothene NA 601 (also referred to herein as PE NA 601 or polyethylene NA 601). Two or more of the polyolefins may be utilized. Extrudable blends of elastomeric polymers and polyolefins are disclosed in, for example, previously referenced U.S. Pat. No. 4,663,220.

Desirably, the elastomeric fibers should have some tackiness or adhesiveness to enhance autogenous bonding. For example, the elastomeric polymer itself may be tacky when formed into fibers or, alternatively, a compatible tackifying resin may be added to the extrudable elastomeric compositions described above to provide tackified elastomeric fibers that autogenously bond. The tackifying resins and tackified extrudable elastomeric compositions as disclosed in U.S. Pat. No. 4,787,699, hereby incorporated by reference, are suitable.

Any tackifier resin can be used which is compatible with the elastomeric polymer and can withstand the high processing (e.g., extrusion) temperatures. If the elastomeric polymer (e.g., elastomeric block copolymer) is blended with processing aids such as, for example, polyolefins or extending oils, the tackifier resin should also be compatible with those processing aids. Generally, hydrogenated hydrocarbon resins are preferred tackifying resins, because of their better temperature stability. REGALREZ® and ARKON® P series tackifiers are examples of hydrogenated hydrocarbon resins. ZONATAK®501 lite is an example of a terpene hydrocarbon. REGALREZ® hydrocarbon resins are available from Hercules Incorporated. ARKON® P series resins are available from Arakawa Chemical (U.S.A.) Incorporated. Other tackifying resins which are compatible with the other components of the composition and can withstand the high processing temperatures, can also be used.

In the practice of this invention, laminates may be made by sequentially depositing onto a moving forming belt first a spunbond fabric layer, then a meltblown fabric layer and last another spunbond layer and then bonding the laminate, provided all layers are made from elastic polymers. The spunbond facings may also be an elastic conjugate or biconstituent fiber layer, for example sheath/core or side by side fibers of polyolefins like polypropylene and polyethylene or blends of polyolefins. FIG. 1 shows a schematic diagram of a continuous manufacturing in-line process for stretch bonding elastic and gatherable webs into a laminate wherein there are two gatherable webs on each opposite side of a stretchable web of two elastomeric polymers. In the FIGURE, an elastic polymer is deposited onto a forming wire 2 from each of two meltblowing spinnerets 1 producing an elastic web 3. The forming wire 2 moves at a certain first speed as the layers are deposited. The elastic web 3 moves forward to pass through bonder rolls 6, 7 where the elastic web 3 is combined with, in this case, two, gatherable webs 4, 5 unwound from supply rolls. The bonder rolls 6, 7 are shown as being comprised of a patterned calender roll 6 and a smooth anvil roll 7 but other methods and arrangements as noted herein may be used. The webs 3, 4, 5 travel in the direction indicated by the arrows associated with the rolls for forming wire 2 and the supply rolls, respectively. The elastic web 3 is stretched to the desired amount by having the bonder rolls 6, 7 rotate at a speed greater than that at which the forming wire 2 moves, producing a bonder/wire ratio of speed. The pressure between the rollers 6, 7 bonds the gatherable webs 4, 5 to the elastic web 3 to form a composite elastic material 8. The composite elastic material 8 is then wound up on a winder 9. In the practice of the invention, the elastic meltblown web 3 need not be stretched prior to bonding and the gatherable webs 4, 5 are replaced with elastic spunbond webs.

A number of samples of material were tested in order to determine their barrier, breathability and elastic properties. The materials are described below and the results given in Table 1. The samples were tested for stretch properties according to the cyclic testing method, Frazier permeability test and hydrohead test described above under "Test Methods" and the results are given in Table 1. In the Table, STS means "stretch to stop". MB means "meltblown" and BW means "basis weight". Note that only the Examples are considered by the inventors to be within the practice of their invention.

CONTROL 1

This material is a standard SMS fabric used commercially by the Kimberly-Clark Corporation in KIMBERLY- CLARK® ULTRA surgical gowns. The data shown in the example is for non-reinforced gowns. In this sample the water resistance test was performed according to AATCC 127-1989 and the air permeability according to ASTM D 737-75. None of the layers of this material is elastic.

COMPARATIVE EXAMPLE 1

This material is an SMS fabric produced generally in accordance with the method described in FIG. 1 at a bonder to wire ratio of 1.5 and a bonding temperature of 145° F. (63° C.). It has a 14 gsm non-elastic gatherable spunbond layer made from a polypropylene polymer designated PF-305 by Montell on either side of a 67 gsm elastic meltblown layer made from a polymer available from the Dow Chemical Co. of Midland, Mich. under the trade name ENGAGE® elastic polymer. This material is a polyethylene copolymer having a melt flow index of 30 grams/10 minutes at 190° C. and 2160 grams according to ASTM test 1238-90b.

EXAMPLE 1

This material is an SMS fabric produced generally in accordance with the method described in FIG. 1 at a bonder to wire ratio of 1.94 and a bonding temperature of 139/131° F. (59/56° C.). It has a 63 gsm elastic spunbond layer made from a polyethylene polymer designated EXACT® 4014 by the Exxon Chemical Company of Houston, Tex. on either side of a 70 gsm elastic meltblown layer made from the same meltblown polymer as in Comparative Example 1.

COMPARATIVE EXAMPLE 2

This material is an SMS fabric produced generally in accordance with the method described in FIG. 1 at a bonder to wire ratio of 2.06 and a bonding temperature of 132° F. (56° C.). It has a 14 gsm non-elastic gatherable spunbond layer made from a polypropylene polymer designated PF-305 by Montell on either side of a 65 gsm elastic meltblown layer made from a polymer available from the Shell Chemical Co. under the trade name KRATON® G-2755 elastic polymer.

EXAMPLE 2

This material is an SMS fabric produced generally in accordance with the method described in FIG. 1 at a bonder to wire ratio of 1.8 and a bonding temperature of 132° F. (56° C.). It has a 63 gsm elastic spunbond layer made from the same polymer as the spunbond of Example 1 on either side of a 65 gsm elastic meltblown layer made from the same meltblown polymer as in Example 1.

TABLE 1

| Sample | BW in Lam. GSM | STS % | Load at Interc. grams | Elong. at Interc. | Frazier Permeability ft$^3$/ft$^2$/m | Hydrohead mBar |
|---|---|---|---|---|---|---|
| Control 1 | | | | | 22 | 79 |
| Comp. Ex 1 | 64 | 24.2 | 410.2 | 19.2 | 307 | 11 |
| Example 1 | 59 | 75.4 | 420.3 | 33.8 | 218 | 13 |
| Comp.Ex 2 | 65 | 25.4 | 381.1 | 21.0 | 265 | 12 |
| Example 2 | 65 | 48.1 | 151.7 | 15.0 | 207 | 14 |

The results in Table 1 show that the material of this invention has good barrier properties and excellent breathability while also providing fabric which is fully elastic.

It has also been found that the fabric of this invention provides a number of other advantages which are not readily apparent upon a cursory examination. In particular, the material of this invention has been found to have good bondability when all layers are based on elastic polyolefins as compared, for example to a mixture of olefin and non-olefin polymers. More particularly, bondability is enhanced when all of the layers are made from the same olefin, e.g. polyethylene. Bondability is quite important for a material such as that used in personal care products since conversion into a finished product requires that the fabric be bonded in some way to other parts of the item. Many materials, when used in a personal care product, for example, must be adhesively connected to the item. The fabric of this invention, when it is a polyolefin like the olefinic polymeric nonwoven, nonelastic material of which most personal care products are made, may be bonded through the use of heat to the rest of the item. Thermal bonding methods like point bonding and through-air bonding are much simpler, more maintenance-free production methods when compared to stitchbonding or adhesive bonding and greatly preferred by manufacturers. Further, since the barrier and breathability properties are so good, the material may be made thinner than competitive elastic materials yet maintain nearly the same properties as the competitive materials resulting in less mass for disposal.

Thinness and lightness of weight are critical attributes for a personal care product since they are in intimate contact with the body. An item, for example a gown, made using this fabric may also use less fabric than before because in the areas normally requiring extra material to accommodate limb movement, this fabric will merely stretch. No excess fabric is required to be added to each gown, therefore. This has additional rewards in that, since less material is used in each product, the cost to the consumer may be lower and the cost of disposal, both in economic and environmental terms, should be lower for the fabric of this invention than for the competitive elastic fabrics.

The inventors believe that the highly conforming, breathable barrier elastic material of this invention provides a mix of attributes which is different from and superior to that of current competitive materials. The fabric of this invention also has superior bondability when all layers are polyolefin, to other polymers used in infection control and personal care products and may be made thinner and more light weight than competitives.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A fully elastic, breathable, barrier fabric laminate comprising
   an intermediate layer, said intermediate layer being comprised of at least one meltblown layer of first elastic fibers of less than 10 microns in average diameter; and
   an outer spunbond layer of second elastic fibers of greater than 7 microns in average diameter bonded to each side of said intermediate layer, wherein said second elastic fibers are conjugate fibers and wherein the barrier fabric laminate is elongatable to at least 125% and recovers at least 40% of its elongation upon release.

2. The fabric of claim 1 wherein said conjugate fibers are sheath/core polyolefin/polyolefin fibers.

3. The fabric of claim 2 wherein said conjugate fibers are sheath/core polypropylene/polyethylene fibers.

4. The fabric of claim 2 wherein said conjugate fibers are sheath/core polyolefin/polyolefin blend fibers.

5. The fabric of claim 2 wherein said conjugate fibers are sheath/core polyolefin blend/polyolefin fibers.

6. The fabric of claim 2 wherein said conjugate fibers are sheath/core polyolefin blend/polyolefin blend fibers.

7. The fabric of claim 1 wherein said conjugate fibers are side by side polyolefin/polyolefin fibers.

8. The fabric of claim 7 wherein said conjugate fibers are side by side polyolefin/polyolefin blend fibers.

9. The fabric of claim 7 wherein said conjugate fibers are side by side polyolefin blend/polyolefin blend fibers.

10. The fabric of claim 7 wherein said conjugate fibers are side by side polypropylene/polyethylene fibers.

11. The fabric of claim 1 wherein said layers are joined thermally.

12. A containment flap for personal care products comprising the fabric of claim 1.

13. An infection control product comprising the fabric of claim 1.

14. An infection control product comprising a nonwoven meltblown web layer of fibers of less than 10 microns in average diameter, where said web layer has a hydrohead of at least 10 mbar, a Frazier Permeability of at least 100 CFM, a basis weight of less than 68 gsm and which is made from an elastic polyolefin, and further comprising a layer of elastic polyolefin spunbond fabric bonded to at least one side of said nonwoven meltblown web, said elastic polyolefin spunbond fabric comprised of conjugate fibers.

* * * * *

UNITED STATES PATENT AND TRADEMARK OFFICE
CERTIFICATE OF CORRECTION

PATENT NO. : 5,952,252

DATED : September 14, 1999

INVENTOR(S) : Susan E. Shawver, et. al.

It is certified that error appears in the above-identified patent and that said Letters Patent is hereby corrected as shown below:

Title page, item [57]

Abstract, Line 7, "an" should read -- a --

Column 1, Lines 51-52, "an" (both occurrences) should read -- a --

Column 1, Lines 59-62, delete "BRIEF DESCRIPTION OF THE DRAWINGS" and two lines that follow.

Column 3, Line 22, "disbursed" should read -- dispersed --

Column 3, Line 67, after force., delete "In"

Column 4, Lines 45 and 47, "coloration" should read -- color --

Column 6, Line 18, "DRAWINGS" should read -- DRAWING --

Column 6, Lines 45, 50, and 52, "an" should read -- a --

Column 7, Line 40, "an" should read -- a --

Column 8, Line 65, "a" should read -- as --

Column 13, Line 8, "an" should read -- a --

Column 13, Lines 21, 32, and 43, "an" should read -- a --

Column 16, Line 16, after "fabric", insert -- being --

Signed and Sealed this

Thirtieth Day of May, 2000

Attest:

Q. TODD DICKINSON

*Attesting Officer*     *Director of Patents and Trademarks*